United States Patent [19]

Senghaas et al.

[11] Patent Number: 5,347,864
[45] Date of Patent: Sep. 20, 1994

[54] LIQUID LEVEL MEASURING APPARATUS

[75] Inventors: Karl A. Senghaas; Peter Senghaas; Jing Wang; Pete T. Kolonko, Jr.; Jerzy Michalec, all of San Antonio, Tex.

[73] Assignee: Electrolab, Inc., San Antonio, Tex.

[21] Appl. No.: 46,063

[22] Filed: Apr. 12, 1993

[51] Int. Cl.⁵ ............... G01F 23/62; G01F 23/72; H01H 35/18
[52] U.S. Cl. ............................. 73/313; 73/319; 73/311; 73/DIG. 5; 73/291; 200/84 C; 335/206; 335/207; 377/21; 377/54
[58] Field of Search .......... 73/313, 308, 319, DIG. 5, 73/311, 291; 364/509; 200/84 C; 335/206, 207; 377/21, 54

[56] References Cited

U.S. PATENT DOCUMENTS 3,050,714  8/1962  Campbell, Jr. ............... 377/67
4,839,909  6/1989  Warner ...................... 377/67 X
4,976,146  12/1990  Senghaas et al. ............. 73/313

Primary Examiner—Diego F. F. Gutierrez
Attorney, Agent, or Firm—Fulbright & Jaworski

[57] ABSTRACT

An improved liquid level measuring apparatus having a plurality of spaced reed switches having a microprocessor attached to the liquid level measuring sensor apparatus. The switches are wired together in parallel and in sets and are addressed by a shift register for providing a parallel to serial shift of the switch status position to the microprocessor. This allows a reduction in the number of conductors existing the sensor and providing an output signal indicating the vertical position of a float relative to the switches. A microprocessor control notes any inoperative switches, disregards the reading of the inoperative switches in calculating liquid level, and provides stored information to the measurement process for compensating for defective switches.

9 Claims, 15 Drawing Sheets

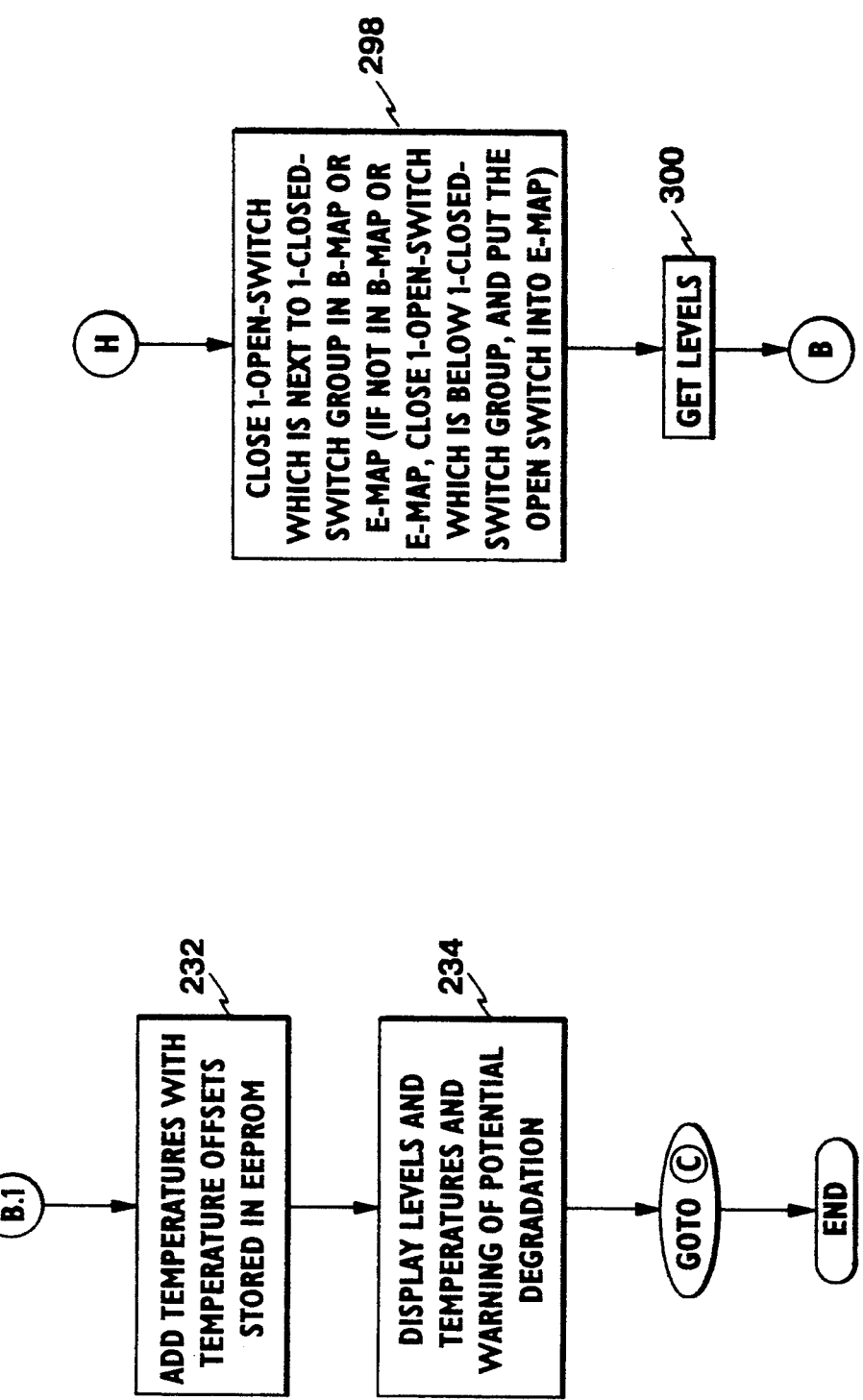

LIQUID LEVEL MEASURING APPARATUS

BACKGROUND OF THE INVENTION

It is known to measure the level of a liquid by the use of reed switches which are actuated by a float containing a permanent magnet as disclosed in U.S. Pat. No. 4,976,146.

Such system uses a plurality of reed switches. In the event that one of the reed switches fails the sensor is unable to perform its measuring function. This becomes a severe limitation in level sensors having a multitude of sensors, for example, as great as 1040 sensors, wherein the likelihood of a failure becomes greater. Secondly, the prior art system utilized a decade interconnection system. While this method reduced the number of electrical components, it still used ten wires from the first ten unit switches in numerical order each connected to a set of ten wires from each of the tens switches connecting all of the tens, and finally connecting all of the 100s to ten wires. This resulted in a requirement of 31 wires including a common wire exiting the level sensor. This multitude of wires, due to decreased conductor spacing, increase the likelihood of transients and lightening faults and limited the measurement range. That is even with 31 wires the sensor was limited to 1000 measurement positions.

The present invention is directed to a digital read out of a reed switch liquid measuring sensor through shift registers, allowing each individual reed switch to be addressed to determine if it is open or closed, and incorporates a microprocessor connected to the sensor to minimize the electrical connections from the sensor, which allows multiple floats to be operated on the same sensor for measuring multiple liquids having different densities, and provides a method of operation so that any failed switches are identified and ignored thereby providing a sensor which continues to function even with failed open or closed reed switches.

SUMMARY OF THE INVENTION

The present invention is directed to a liquid level measuring apparatus having a plurality of spaced reed switches vertically aligned for positioning in a liquid, each reed switch vertically overlapping the adjacent above and below reed switches, the longitudinal axis of the reed switches being at an angle to the vertical and a float carrying magnetic means movably positioned adjacent said plurality of switches in which the magnetic means includes a magnetic field for sequentially actuating switches as the float moves relative to the switches of an improvement comprising a microprocessor attached to the liquid level measuring apparatus. The switches are electrically connected together in parallel in a plurality of sets. A plurality of shift registers, are provided in which each register is connected to one of the sets of the switches and the registers are connected together to the microprocessor for supplying a parallel to serial conversion of the open or closed status of each switch. The microprocessor provides an output signal indicating the vertical position of the float relative to the switches.

Still a further object of the present invention is wherein the magnetic field is effective for actuating a minimum of two switches at all times for providing an error correcting procedure. Preferably the magnetic field is effective for providing a sequential actuation of at least two and then at least three switches at all times.

Still a further object of the present invention is wherein the float means includes first and second separate floats having different buoyancies for simultaneously measuring the level of two liquids of different densities. Preferably, the first and second floats may be in physical contact and act as a single float on the high density liquid in the absence of a second lower density liquid. Upon the introduction of the lower density liquid, the floats separate with one open switch therebetween providing a measurement resolution of one switch spacing for detection of the less dense liquid.

Yet a still further object of the present invention includes means connected to the microprocessor noting an inoperative switch and disregarding the reading of the inoperative switch.

Still a further object of the present invention is wherein the microprocessor stores a list of inoperative switches and means are electrically connected to microprocessor for updating the list of inoperative switches and implementing stored information to compensate for defective switches.

Yet a still further object of the present invention is wherein a closed housing is provided about the switches and a moisture detector is positioned adjacent the bottom of the switches for detecting any moisture inside the housing.

Another object of the present invention is the provision of means for identifying when the level measurement is potentially degraded by the presence of a failed switch, at the top or bottom of a measured group of switches, which has been previously identified in the measurement array.

Other and further objects, features and advantages will be apparent from the following description of a presently preferred embodiment of the invention given for the purpose of disclosure, and taken in conjunction with the accompanying drawings.

DESCRIPTION OF THE PREFERRED EMBODIMENT

Figure 1:
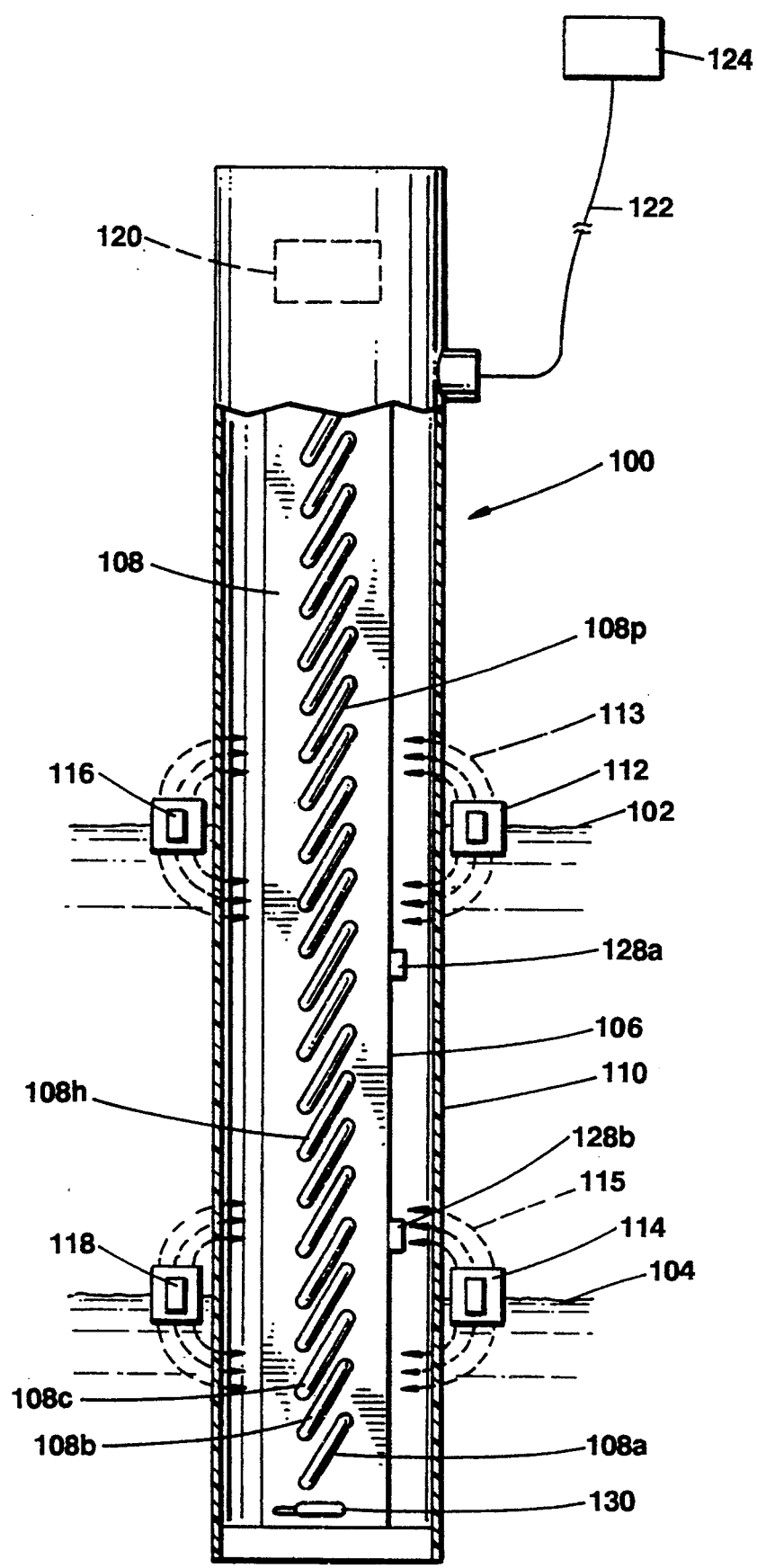
FIG. 1 is an elevational view, partly in cross section and partly schematic illustrating a liquid level measuring sensor of the present invention.

Referring now to the drawings, and in particularly to FIG. 1, the reference numeral 100 generally indicates the apparatus of the present invention which is adapted to be inserted into a liquid container for measuring the level of one or more liquids such as levels 102 and 104, for example such as gasoline and water stored in an underground gasoline tank or oil and water in an above ground crude oil storage tank. The liquid level measuring sensor or apparatus includes a support 106 such as a printed circuit board on which is positioned a plurality of spaced reed switches 108 and which includes individual switches 108a et al. A non-magnetic conduit 110 such as PVC or fiberglass surrounds and protects the circuit board 106 and switches 108 from the surrounding liquid. Float means are movably positioned coaxially around the conduit 110 and carry magnetic means such as a plurality of permanent magnets. Thus, for measuring dual fluid levels floats 112 and 114 are provided carrying magnetic means 116 and 118, respectively. The floats 112 and 114 have different buoyancies for simultaneously moving with the liquid levels 102 and 104 of liquids of different densities. As the liquid levels 102 and 104 change, the floats 112 and 114 will move vertically relative to the switches 108 thereby providing a read-out of the liquid levels 102 and 104. The two floats 112 and 114 may be in physical contact, both move with the higher density liquid 104, and thus function as a single float closing a greater number of consecutive switches. While a small quantity of the less dense liquid 102 is introduced, the floats 112 and 114 separate. This results in one open switch separating the two floats 112 and 114 thereby yielding a resolution of one switch spacing for detecting the presence of the less dense fluid 102.

As is conventional, the reed switches 108 consist of first and second leads which, when exposed to the same pole of an external magnetic field are repelled to cause the switch to open, but when the leads are exposed to opposite pole of an external magnetic field the leads are attracted to each other and close the switch. As disclosed in U.S. Pat. No. 4,976,146 the reed switches are vertically aligned and each reed switch vertically overlaps the adjacent above and below reed switch. Thus, reed switch 108b, while vertically spaced from reed switches 108a and 108c, has its upper and lower ends vertically overlapping reed switches 108a and 108c. The amount of overlap is dictated by the desired resolution. Secondly, the longitudinal axis of each reed switch 108 is at an angle to the vertical longitudinal axis of the support 106, such as, for example approximately 30°. However, while the level sensor shown in U.S. Pat. No. 4,976,146 was advantageous over the prior art it had several limitations. First, the prior art level sensor was wired to a read-out device by decade interconnection system by 10 ones, 10 tens, and up to 10 hundreds of level steps. This resulted in a multi-wire assembly, limited measurement positions, and increased cost. In addition, the reed switches 108 are somewhat subject to failure, and in the case of a level sensor 100 having many reed switches 108, the chance for a single failure is great. In the prior art sensor, a failure of a single reed switch resulted in disabling the read-out.

One of the features of the present invention is the provision of a microprocessor 120 for receiving a parallel to serial conversion of the status of the reed switches 108 which reduces the number of required conductors in the cable 122 exiting the sensor and connected to an external microprocessor or computer system or readout 124. As will be described the number of wires in the cable 122 is reduced, as compared to the prior art system, for a single float system from 31 to 4 conductors and for a two float system are reduced from 50 to 6 conductors. The advantages of reducing the number of conductors is an increased immunity against transients and lightening due to the increase conductor spacing, and lower cost and complexity. Another advantage of the microprocessor is that while the prior art sensor having 31 wires was limited to 1000 measurement positions the present sensor using the microprocessor 120 is not practically limited to any measurement range. This becomes important as in one embodiment being manufactured in which the sensor includes 1040 reed switches.

Figure 2:
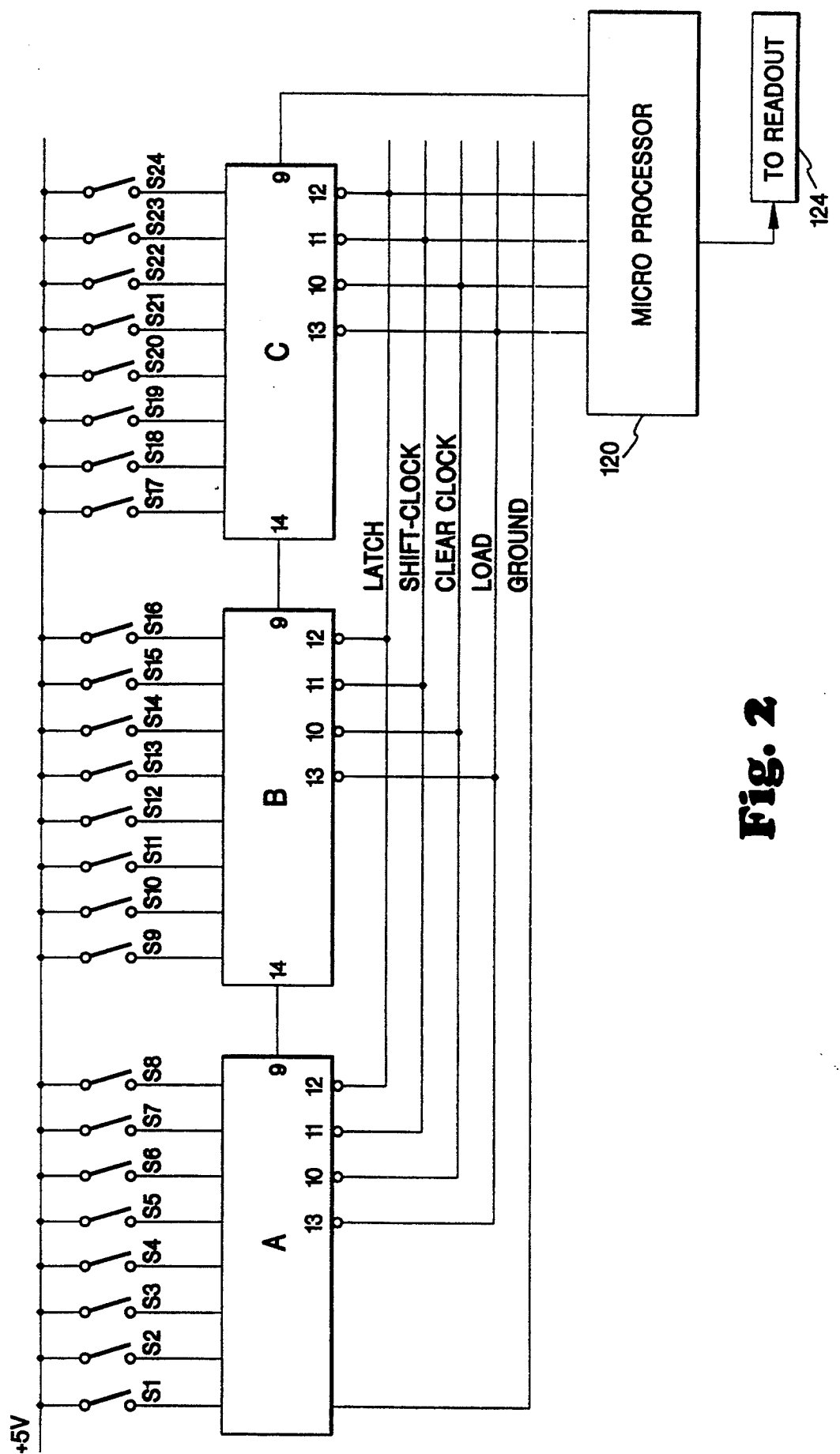
FIG. 2 is a schematic diagram illustrating the principle of connecting a plurality of shift registers to the reed switches of FIG. 1, FIGS. 3A and 3B are continuations of each other and form an electrical schematic diagram of a liquid level sensor having forty reed switches.

Referring now to FIG. 2, the microprocessor 120 allows each individual reed switch to be addressed and to determine whether the switch is open or closed. The switches are individually wired in parallel in sets of eight through an integrated circuit which is addressed by a shift register and which then provides a parallel to serial shift which is transmitted to the microprocessor 120. The microprocessor can then identify each individual switch and determine if it's in the open or closed position. In the schematic shown in FIG. 2, for example only, three shift registers A, B, and C are shown which are each connected to a set of eight parallel reed switches. Thus, shift register A is connected to reed switches 1–8, shift register B is connected to reed switches 9–16 and shift register C is connected to reed switches 17–24. To retrieve the information a clock signal is applied to the LATCH line which causes all of the shift registers A, B, C to latch. This holds a supply voltage, here 5 volts potential, on all of the closed switches. All other inputs are pulled to ground by suitable resistor network. The latch signal holds the 5 volt potential on the closed switches on pin 12 in the registers. Another clock signal on the SHIFT-clock line applies a signal on pin 11 of the shift registers to move the information in the registers A, B, & C by one step. Repeating this stepping will shift the closed switch information (one step at a time) to the microprocessor 120 as a serial pulse train. The microprocessor 120 relates the closed switches, appearing as binary ones, to the number of shift steps, which in turn identifies the float position on the sensor. This process is repeated rapidly to permit the travel of the floats 112 and 114 travel to follow rapid liquid level changes. After each measurement, the shift registers are reset and ready to identify a new float position.

Figure 3A:
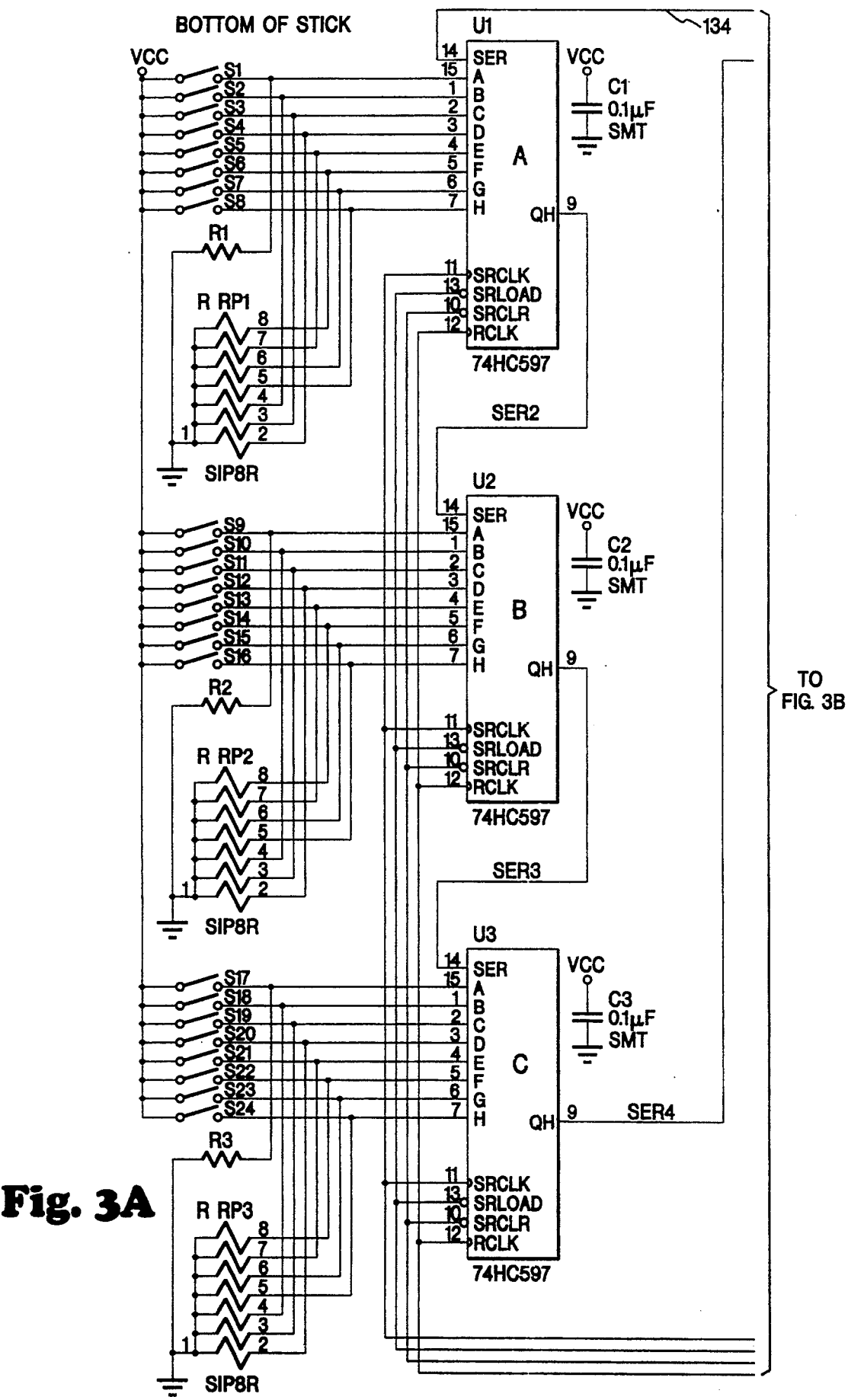
Figure 3B:
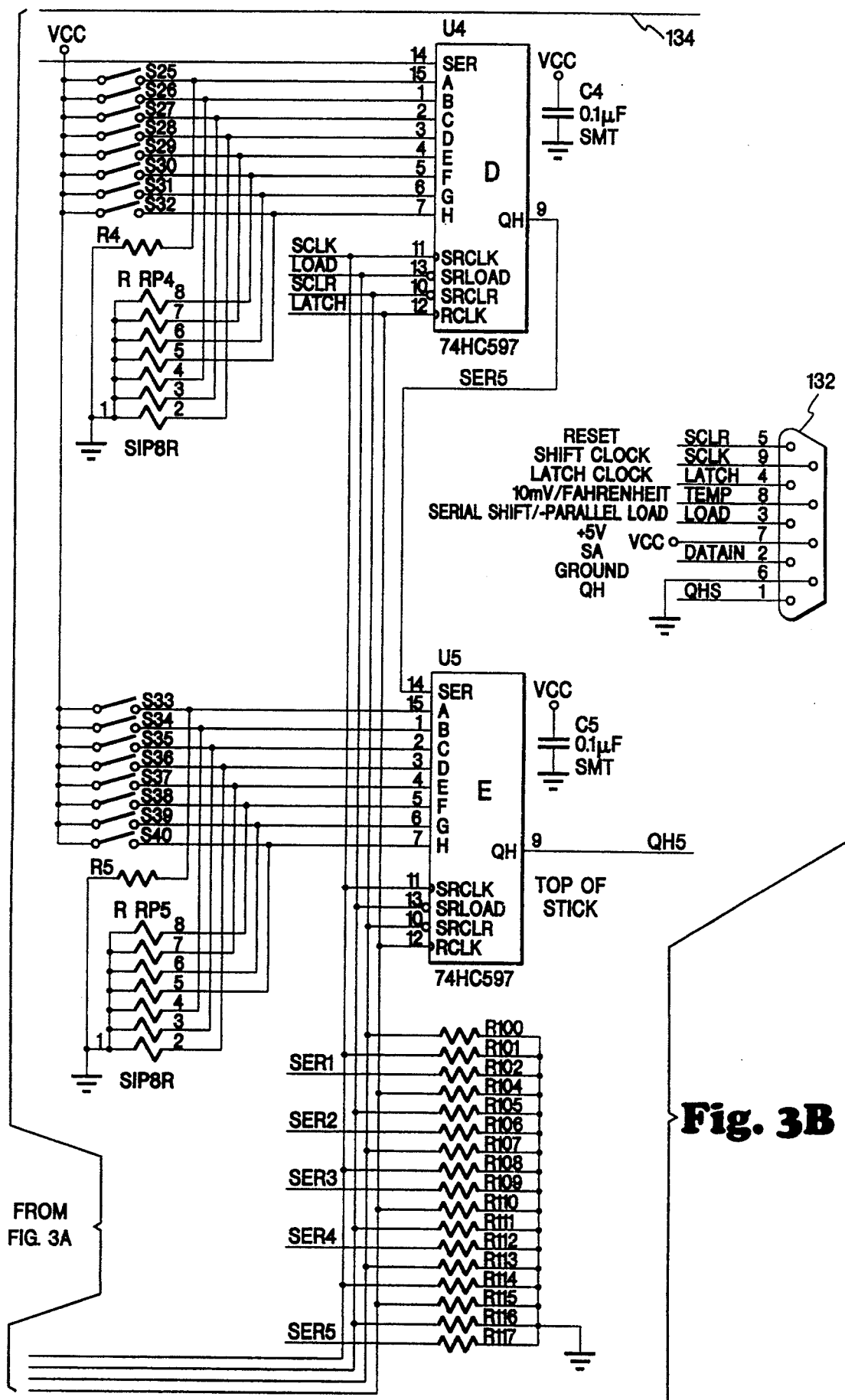

Referring now to FIGS. 3A and 3B a more complete schematic diagram of one sensor board is shown. In this embodiment five shift registers A, B, C, D, E are wired in series on a forty switch printed circuit board 106 at a half inch spacing. Obviously any number of boards 106 in series may be used to form a level sensor. Thus, for a 120 inch level sensor a total of six twenty 20 inch length PC boards 106, with 6×40 switches, which equals 240 individual switches used. The diagram in FIG. 3A illustrates the interconnection of a single forty switch board having a terminal 122. As additional features the sensor 100 may measure temperature through one or more temperature probes 128a and 128b (FIG. 1) which is read over TEMP line in FIG. 38. An additional feature is the use of a ground electrode 130 (FIG. 1) for measuring the presence of any undesirable liquid inside of the housing 110 by an actuation of the DATA IN line (FIG. 3B) which is connected to line 134. FIGS. 3A and 3B more clearly indicates the parallel to signal conversion of the status of each of the reed switches S1-S40. Normally the shift registers A-E and the pulled down resistors are positioned adjacent the reed switches on the printed circuit board 106. Obviously the switch spacing and number of switches would depend upon the application. For example, the half-inch spacing may be generally utilized for measuring liquid level of oil or water while closer spacing such as two-tenths of an inch may be utilized for measuring gasoline. And while a single temperature sensor may be satisfactory for temperature compensation of crude oil, multiple sensors such as five would be more desirable for temperature compensation in measuring gasoline.

Figure 4A:
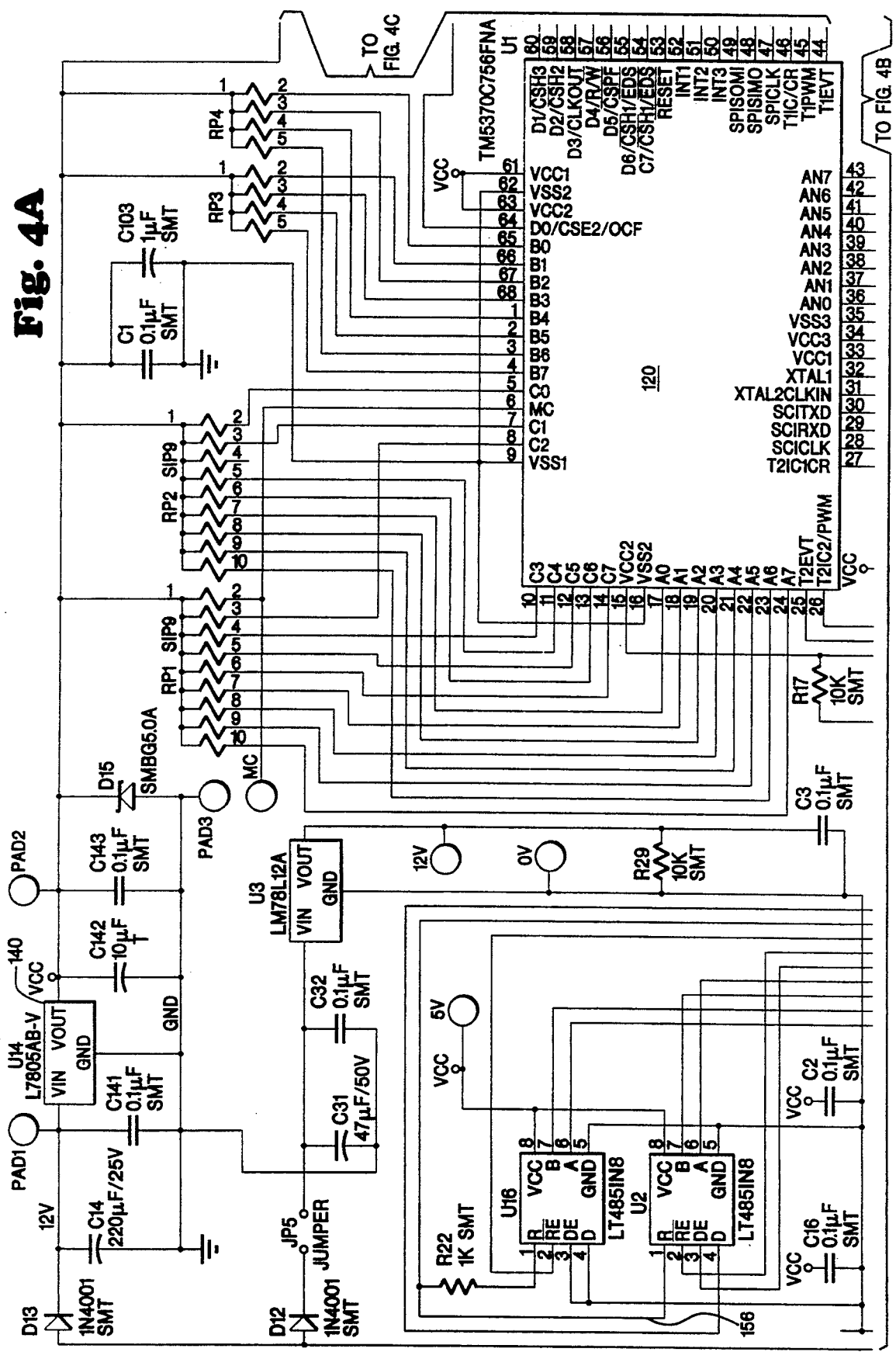
FIGS. 4A, 4B and 4C are continuations of each other and form an electric schematic diagram of a microprocessor and its interface for connection to the sensor circuit of FIG. 3, FIGS. 5A, 5B, 5C and 5D are continuations of each other and form a flow logic diagram of the operation of the liquid level sensor of the present invention, and FIGS. 6A, 6B, 6C, 6D and 6E form a flow logic diagram of the error connection block in FIG. 5B for detecting, and compensating for any failed reed switch.
Figure 4B:
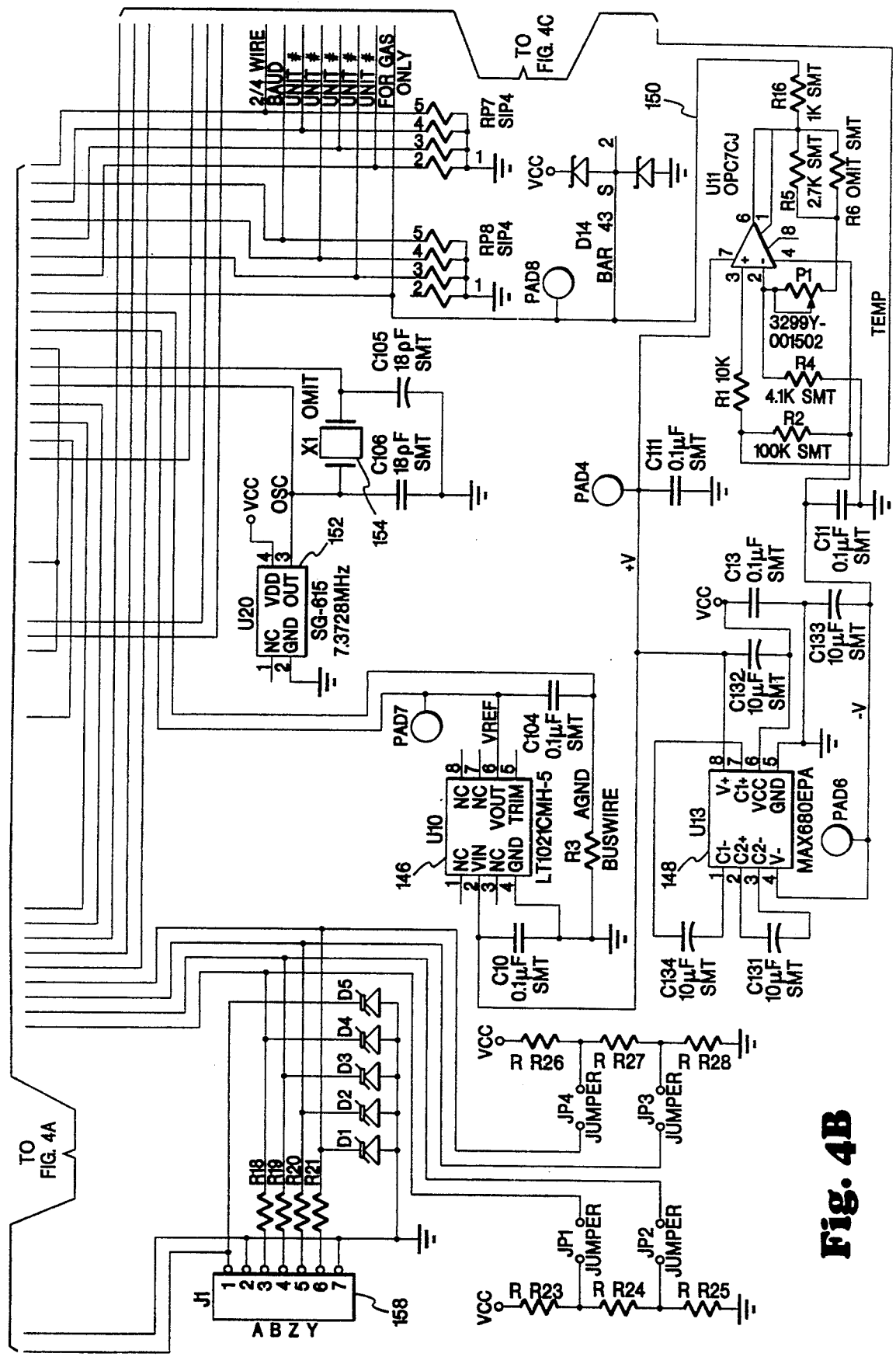
Figure 4C:
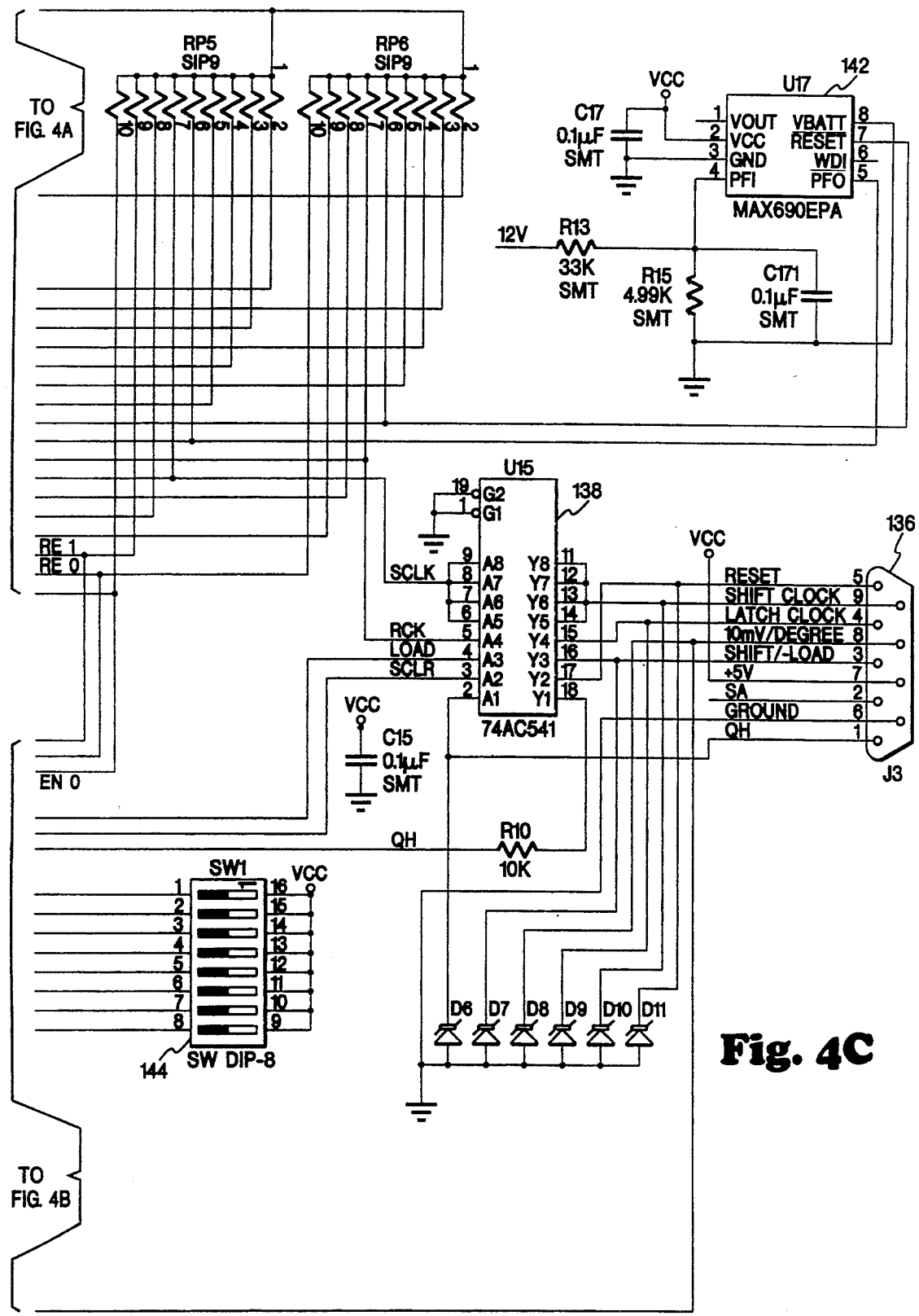

Referring now to FIGS. 4A, 4B and 4C a schematic diagram of the microprocessor 120 and its connections is shown in greater detail then required for the present invention. A terminal 136 is provided for connection to the terminal 132 of FIG. 3 wherein the signals are supplied to a buffer 138 and to the microprocessor 120. The interface circuit shown in these figures includes a voltage regulator 140, a low voltage reset 142, program instruction input 144, a 5 volt reference 146, a voltage converter 148, a temperature sensor amplifier 150, an oscillator 152, a crystal clock 154 and a 485 logic circuit 156 for converting the output to a standard RS-485 serial communication protocol to output terminal 158. It is to be noted that the microprocessor 120 includes an analog to digital conversion for providing accurate analog temperature measurement of the liquid being measured while digitizing the temperature measurement to an output without shielded cables.

Another problem, as indicated, in the prior art is that if one of the reed switches 108 failed then the read-out from the level sensor failed. Another feature of the present invention is the provision of a method and apparatus of detecting any failed switches and ignoring the failed switches by implementing stored information into the read-out system. However, in order to identify failed switches an assumption is made that the sensor 100 does not include two or more consecutive bad switches. A further requirement is that the magnetic fields 113 and 115 of the magnets 116 and 118, respectively, must be of such an extent that they will at all times actuate a minimum of two switches. Preferably, as will be more fully discussed the strength of the magnetic field produced by the magnets 16 or 18 should be selected for sequentially actuating at least two and then three switches as the floats 112 and 114 move relative to the switches 108. The greater number of switches 108 that are actuated by the magnetic field allows a greater determination of defective switches.

Figure 5A:
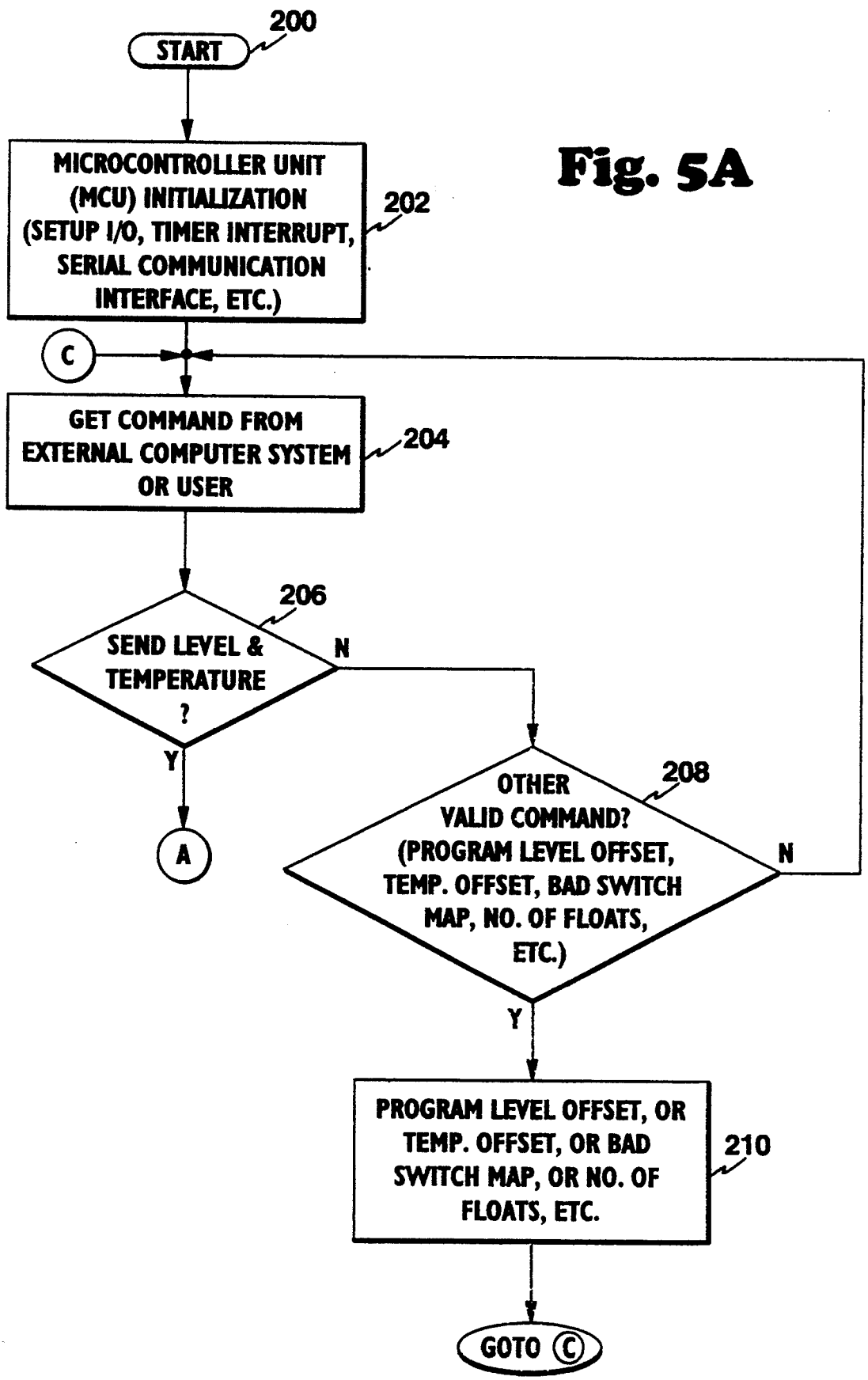
Figure 5B:
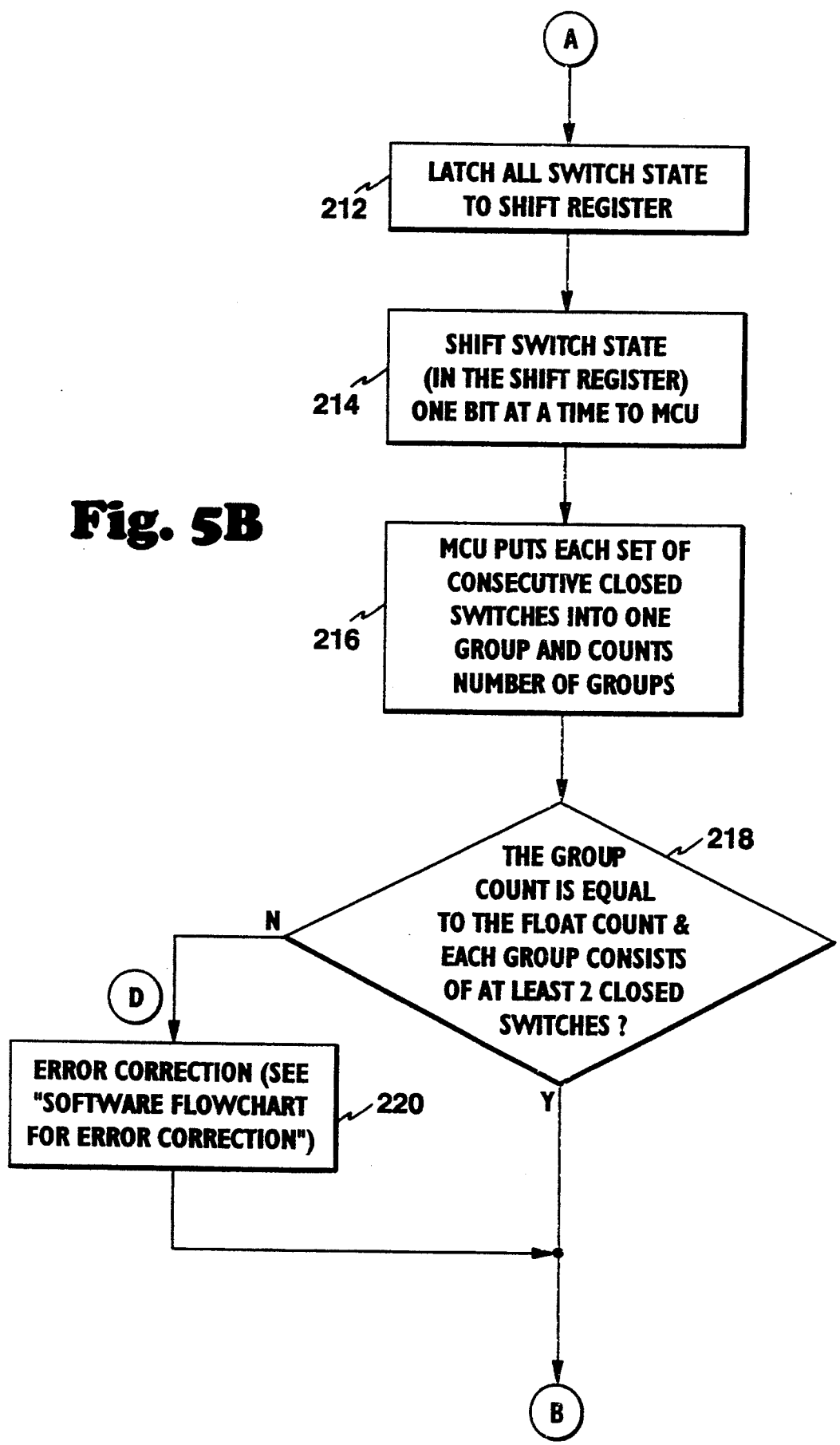
Figure 5C:
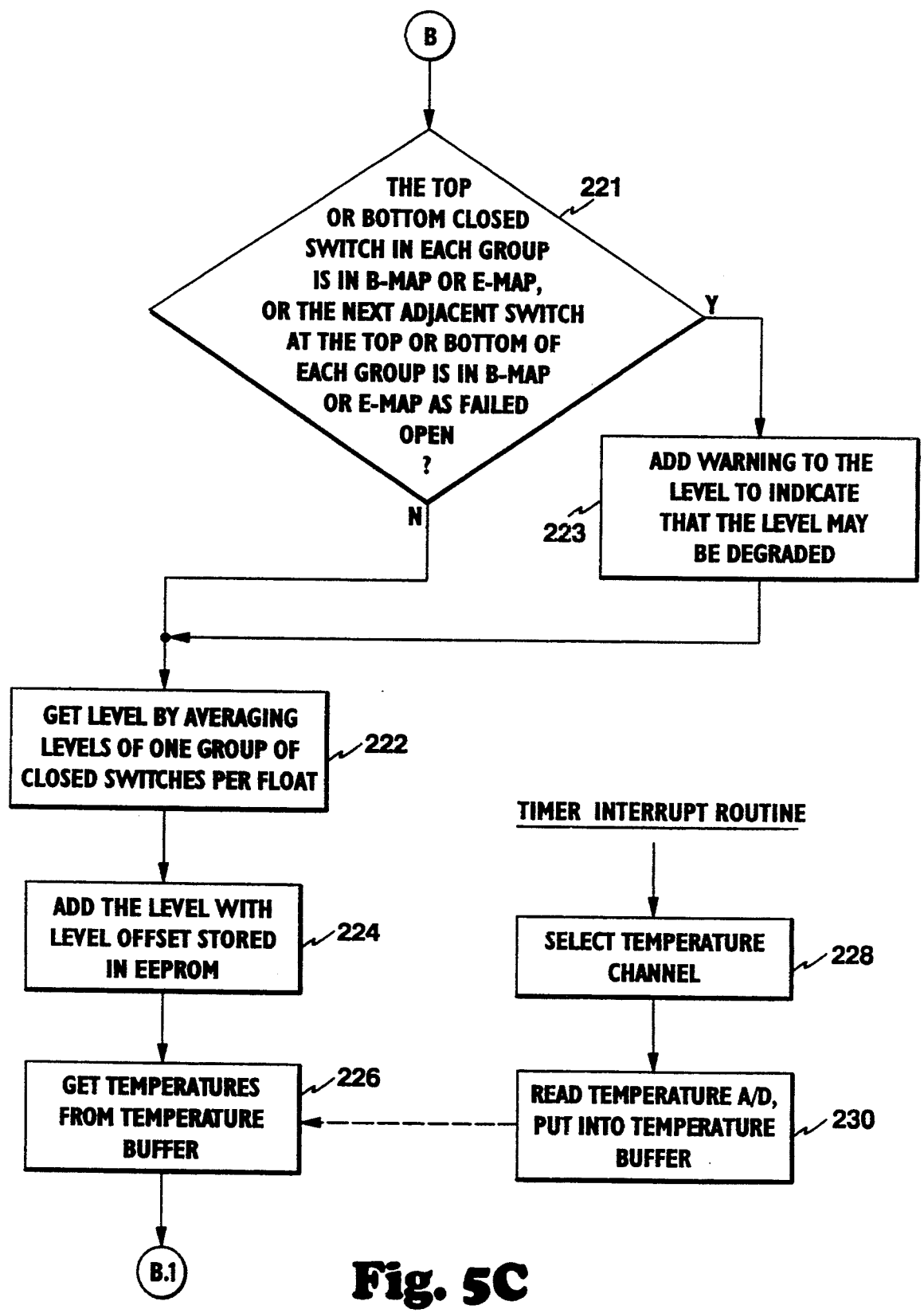

Referring now to FIGS. 5A, 5B and 5C, the logic flow diagram for operation of the sensor apparatus 100 is best seen. Step 200 is the start step which when actuated moves to step 202 to provide the set up for the microprocessor 120. In step 204 an execute command may be received from the computer 124 such as step 206 which is a send liquid level and temperature measurement. Other types of commands may be given in steps 208 and 210. Upon a command in 206, step 212 (FIG. 5B) latches all of the shift registers A, B, C, D, E (FIG. 3) and measures which of the reed switches 108 are closed. In step 214 the parallel reading of all of the reed switches is shifted to a serial reading and shifted one bit at a time to the microprocessor 120. In step 216 the microprocessor 120 processes the information as to which of the reed switches is open and which is closed. At this time the microprocessor counts groups. A group is one or more closed switches. However, a set of consecutive closed switches counts as only one group.

Step 218 is an error determination step. The float count is the number of floats used in the installation 100 such as either 112 or 114 or both. Therefore, if the reed switches 108 are all correctly operating the group count will equal the float count and each group consists of at least two closed switches. However, if the group count is greater than the float count which indicates there are stray (failed) closed switches or the group count is equal to the float count but there is only one closed switch in any of the groups which indicate that there are stray (failed open) switches, then in either case there are defect(s) in some of the reed switches. If the answer to step 218 is no, then an error correction step 220 is made which will be more fully discussed in connection with FIG. 6A–6E. If there is no error then the next step is step 221 (FIG. 5C) which determines if the indicated level is potentially degraded in accuracy by the presence of a failed close switch in the top or bottom position of any group or by the presence of a failed open switch immediately adjacent to the top or bottom switch of any group. If yes, go to step 223 where the warning is added to the level message before proceeding to step 222 to obtain the level. If no, proceed to step 222 which averages all of the levels of the group of closed switches to provide an accurate determination of fluid level. In step 224 a level offset may be utilized in the event that the housing 110 (FIG. 1) is positioned in a liquid tank so that the reed switches 108 are offset from the bottom of the tank. In step 226 temperature measurements from the microprocessor 120 and any temperature sensor such as 128a and 128b are received to temperature compensate for the temperature of the fluids in order to obtain an accurate volume measurement. The temperature measurements are obtained from steps 228 and the analog to digital step 230 in the microprocessor 120. Step 232 adds a temperature effect and the display of the levels and temperature is performed in step 234. Also in step 234, a warning is also provided that the indicated level may be degraded due to the presence of a failed open or closed switch in such a position that it might impair the accuracy of the level measurement (the amount of potential accuracy impairment is also known).

As indicated in FIG. 5B if the step 218 indicates that there is an error of a bad reed switch which is either failed in the open or closed position an error correction step 220 is performed to determine the defective switch and to implement stored information into the read-out system to overcome the effect of the defective reed switch. In this connection it is to be noted that the microprocessor 120 includes an EEPROM storage element in which is stored a bad switch map which can be updated by the external computer 124. The bad switch map is known as the B-MAP. In addition, the EEPROM in the microprocessor 120 also includes an E-MAP for storing possible bad switches which when confirmed are transferred to the B-MAP category.

Figure 6A:
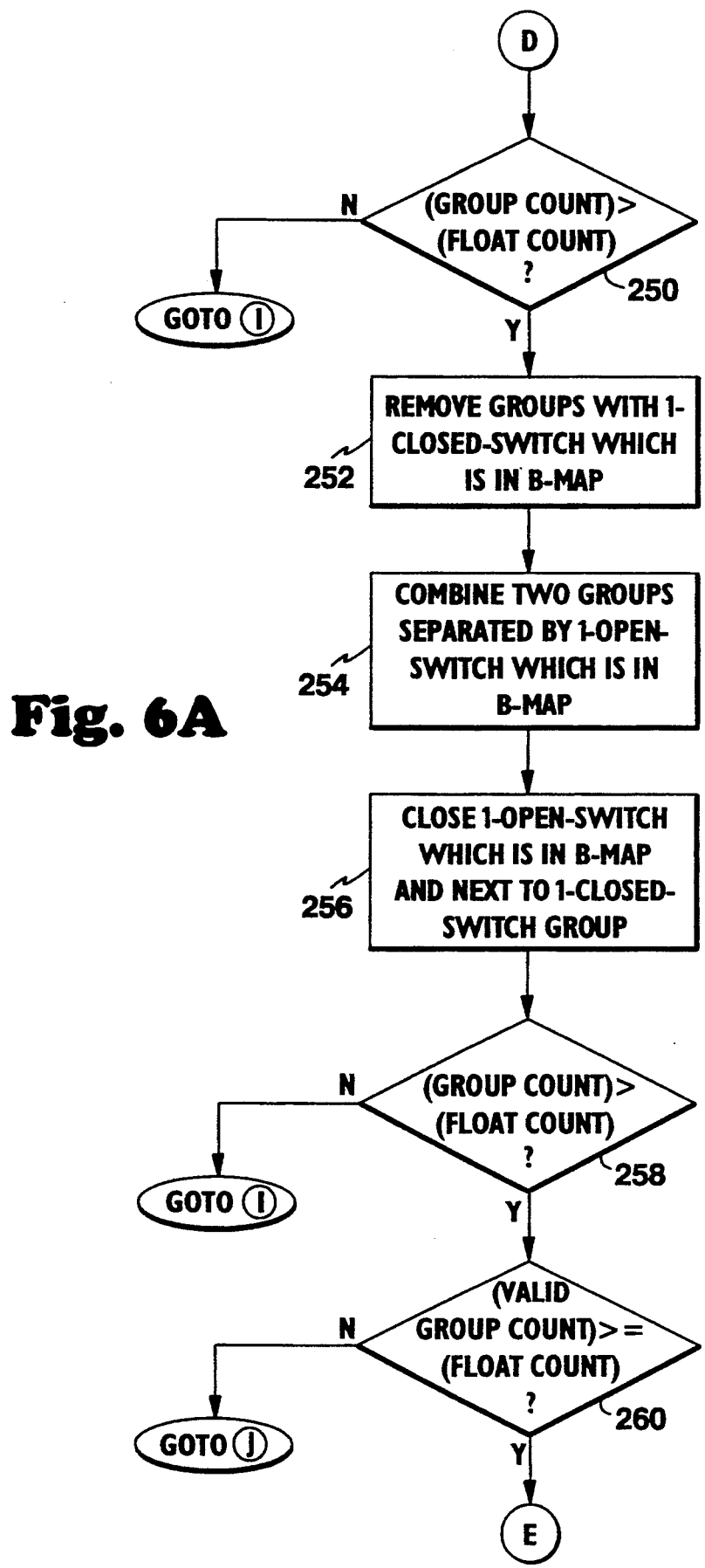
Figure 6B:
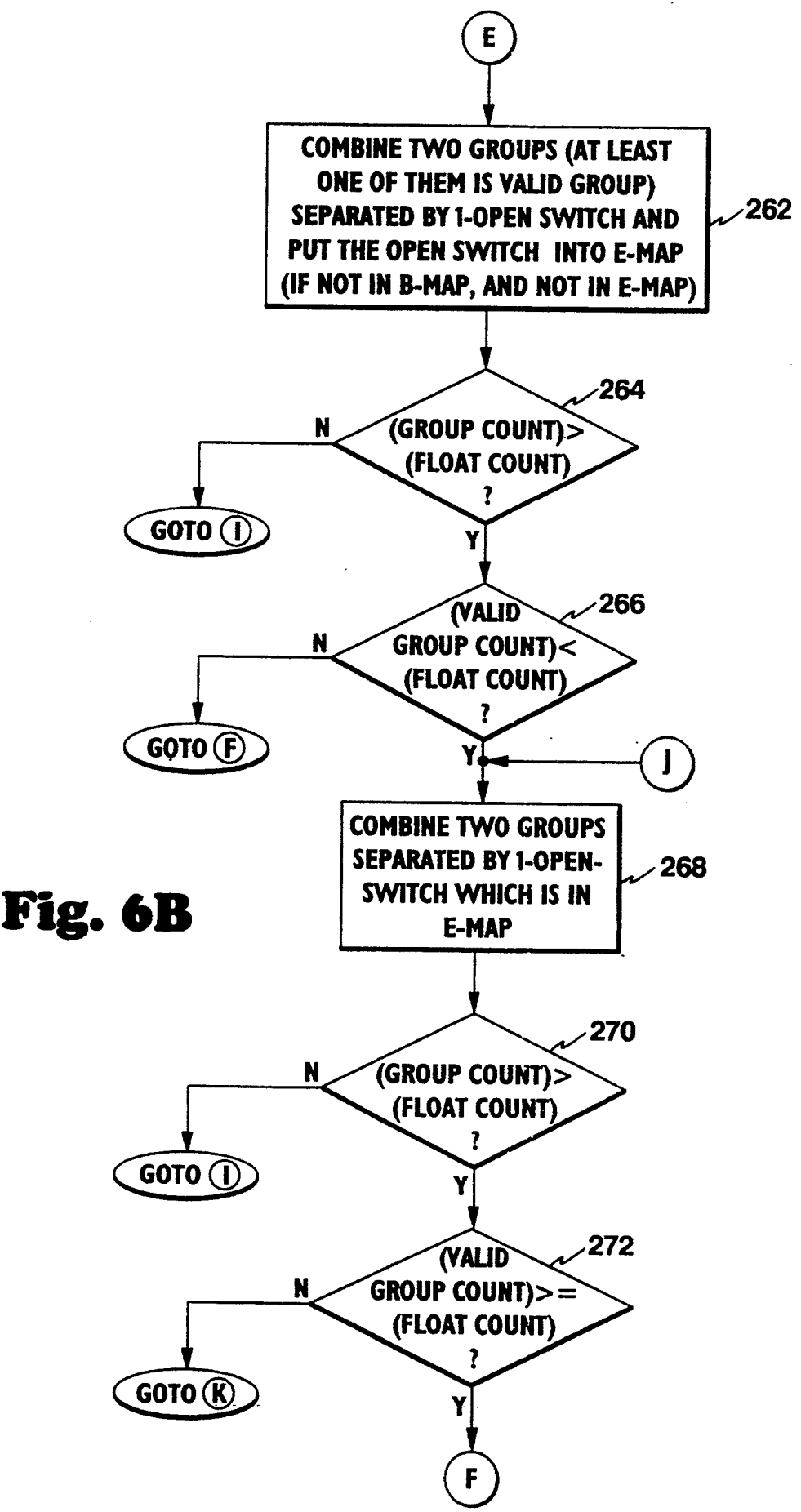
Figure 6C:
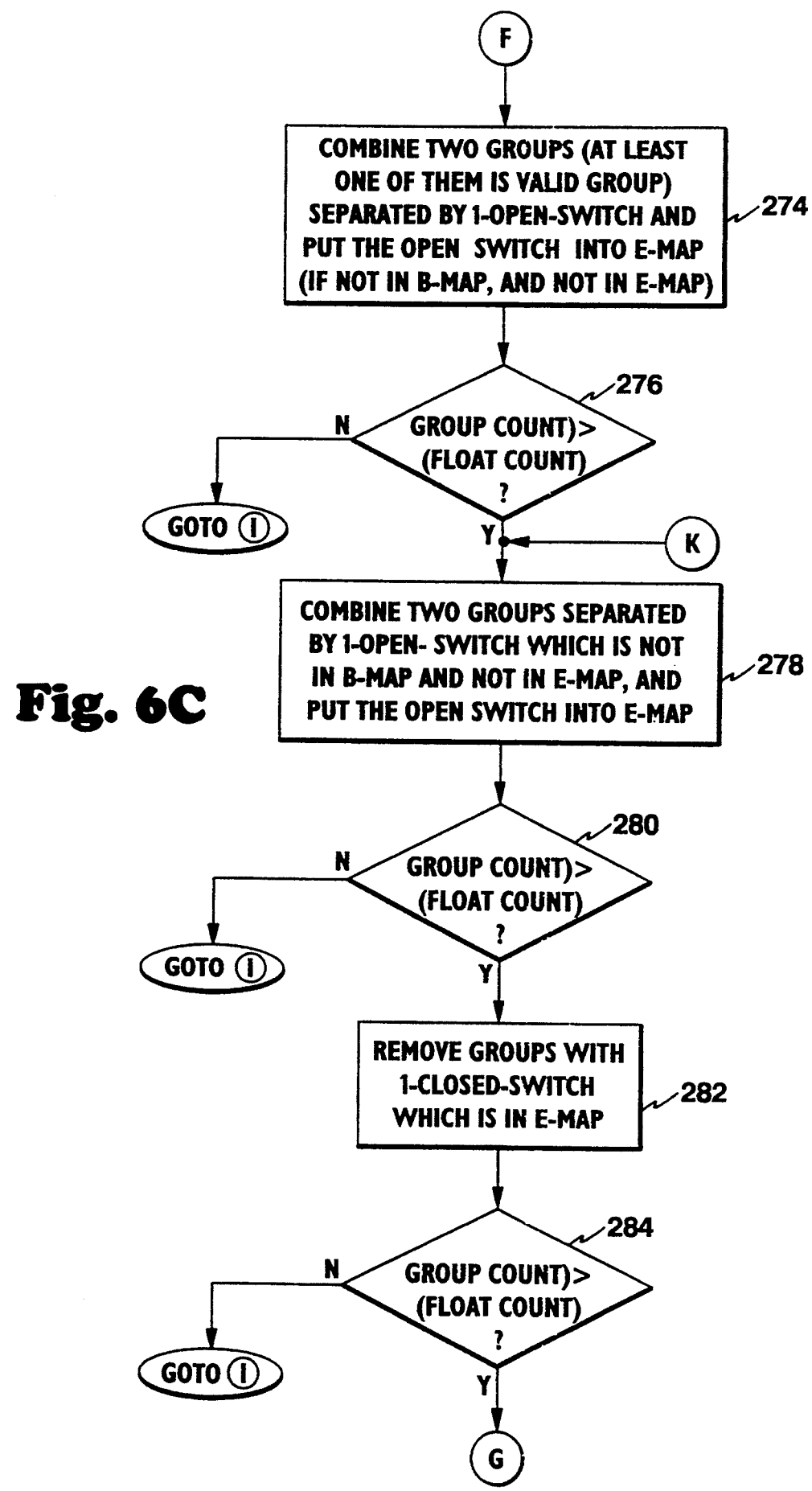
Figure 6D:
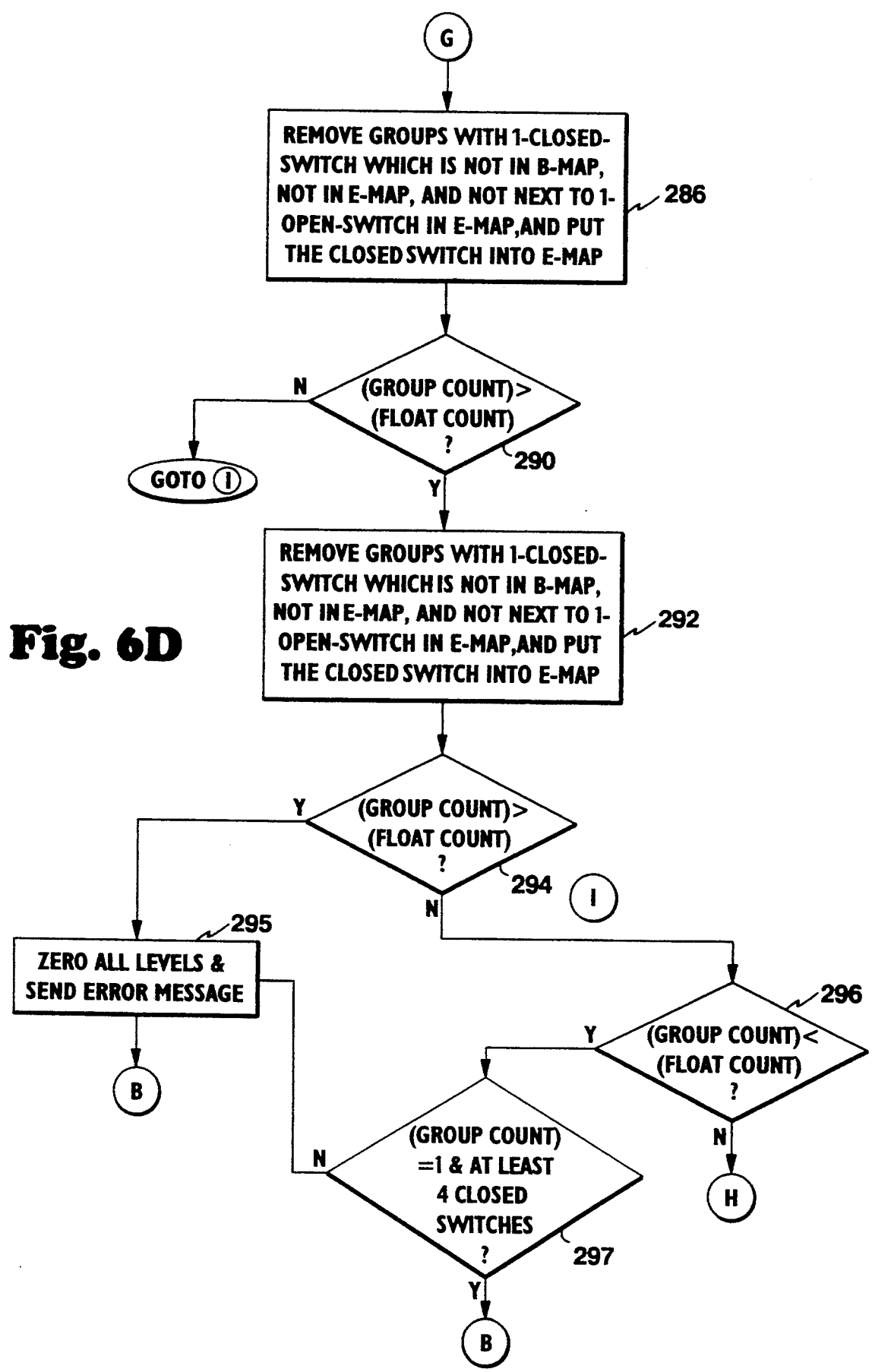

Referring now to the error correction flow diagram (FIGS. 6A, 6B, 6C, 6D, and 6E) starting in FIG. 6A, in step 250 the group count is measured versus the float count and if the group count is not greater than the float count the path is to step I. However, if in step 250 the group count is greater than the float count this indicates that there is a failed closed reed switch(es) somewhere in the sensor. In step 252 any bad reed switches which were already programmed into the B-MAP are subtracted and removed which eliminates one source of error. In step 254 two groups, which are separated by one open switch which is already recorded in the B-MAP are combined to reduce another source of error. In step 256 any open switch which is recorded in the B-MAP and which is positioned next to a one closed switch group is closed. Again in step 258 the newly constituted group counts are compared to the float count and if still not greater than the float count are directed to I. However, if the group count is greater than the float count step 260 which compares the valid group count versus the float count in which the valid group count is a group with at least two consecutive closed switches. If the valid group count is not greater than the float count, then the correction path goes to J. However, if the valid group count is greater than the float count this indicates that there are two groups separated by one open switch within each group. Therefore, proceeding to step 262 the two groups, at least one of them a valid group, are combined and the open switch is recorded in the E-MAP memory if it is not already in the B-MAP and E-MAP memory. Again in step 264 the group count is compared with the float count and if it is not greater than the path leads to I. If it is greater, step 266 compares a valid group count to the float count and if the valid group count is not less than the float count then the path goes to F. However, if the count is less than the float count step 268 combines two groups separated by one open switch which is recorded in the E-MAP.

Again in step 270 the group count is compared with the float count and if it is not greater then the path of action goes to I. If it is greater, then 272 compares whether the valid group count is greater or equal to the float count. If it is, then we go to step 274 which combines two groups, at least one of them a valid group, separated by an open switch and put the open switch into the E-MAP if not already in the B-MAP or the E-MAP. Again a comparison of the group count versus the float count is made in step 276 and if the group count is not greater go to step I. If the group count is greater then go to step 278 which combines two groups separated by one open switch which is not in the B-MAP and not in the E-MAP and put the open switch into the E-MAP memory. Again in step 280 a new comparison is made of the group count versus the flow count and if it is not greater go to step I. If it is greater go to step 282 which removes groups with one closed switch which is recorded in the E-MAP. Another comparison is made in step 284 and if the group count is not greater than the float count go to step I but if the group count is greater than the float count go to step 286. Step 286 removes groups with one closed switch which is not in the B-MAP, not in the E-MAP, and not next to one open switch in the E-MAP and put the closed removed switch into the E-MAP. Another comparison is made in step 290 and if the group count is still not greater than the float count go to I. If the count is greater then go to step 292 which removes groups with one closed switch which is not in the B-MAP, not in the E-MAP, but next to one open switch in the E-MAP and put the removed closed switch into the E-MAP. Another comparison is made in step 294 of the group count versus the float count and if the group count is greater than the float count there is an error and step 295 zeros all levels and sends an error message. If the group count is not greater than the float count, step 296 determines if the group count is less than the float count and if so goes to step 297. In step 297, if there is one group with two floats and that group includes four or more switches, go to B (step 222). If the group has less than four switches, go to step 295 to zero the levels and send an error message. If the group count is not less than the float count go to step 298 which closes one open switch which is next to one closed switch group in the B-MAP or E-MAP (but if not in B-MAP or E-MAP, close one open switch which is below one closed switch group and put the open switch in the E-MAP). This completes the error correction and step 300 measures the levels and returns to step 222 (FIG. 5C).

Therefore, the above flow logic diagram on each measurement detects bad switches, ignores them and implements stored information in the read-out system to overcome defective switches.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of invention and the scope of the appended claims.

What is claimed is:

1. In a liquid level measuring apparatus having a plurality of spaced reed switches vertically aligned for positioning in a liquid, each reed switch vertically overlapping the adjacent above and below reed switches, the longitudinal axis of said reed switches being at an angle to the vertical axis of the apparatus and a float carrying magnetic means movably positioned adjacent said plurality of switches, said magnetic means having a magnetic field for sequentially actuating switches as the float moves relative to the switches, the improvement comprising, a microprocessor attached to the liquid level measuring apparatus, said switches electrically connected together in parallel in a plurality of sets, a plurality of shift registers, each register connected to one of the sets of switches, said registers connected together and to the microprocessor for supplying a parallel to serial conversion of the open or closed status of each switch, and said microprocessor providing an output signal indicating the vertical position of the float relative to said switches.

2. The apparatus of claim 1 including a closed housing enclosing the switches, and a ground electrode a bottom of the housing and below the switches for detecting any moisture inside the housing.

3. In a liquid level measuring apparatus having a plurality of spaced reed switches vertically aligned for positioning in a liquid, each reed switch vertically overlapping the adjacent above and below reed switches, the longitudinal axis of said reed switches being at an angle to the vertical axis of the apparatus and a float carrying magnetic means movably positioned adjacent said plurality of switches, said magnetic means having a magnetic field for sequentially actuating switches as the float moves relative to the switches, the improvement comprising, a microprocessor electrically connected to the liquid level measuring apparatus, said switches electrically connected together in parallel in a plurality of sets, a plurality of shift registers, each register connected to one of the sets of switches, said registers connected together and to the microprocessor for supplying a parallel to serial conversion of the open or closed status of each switch, said microprocessor providing an output signal indicating the vertical position of the float relative to said switches, and said magnetic field is effective for providing a sequential activation of at least two and then at least the next three switches of said plurality of switches at all times.

4. The apparatus of claim 3 including means connected to the microprocessor for noting an inoperative switch and disregarding the reading of the inoperative switch.

5. In a liquid level measuring apparatus having a plurality of spaced reed switches vertically aligned for positioning in a liquid, each reed switch vertically overlapping the adjacent above and below reed switch, the longitudinal axis of said reed switches being at an angle to the vertical axis of the apparatus and a float means carrying magnetic means movably positioned adjacent said plurality of switches, said magnetic means having a magnetic field for sequentially actuating switches as the float means moves relative to the switches, the improvement comprising, a microprocessor electrically connected to the liquid level measuring apparatus, said switches electrically connected together in parallel in a plurality of sets, a plurality of shift registers, each register connected to one of the sets of switches, said registers connected together and to the microprocessor for supplying a parallel to serial conversion of the open or closed status of each switch, said microprocessor providing an output signal indicating the vertical position of the float means relative to said switches, and said float means including first and second separate floats having different buoyancies for simultaneous measuring the level of two liquids of different densities.

6. The apparatus of claim 5 wherein when said two floats are positioned in contact with each other, the two floats jointly actuate a plurality of consecutive switches.

7. In a liquid level measuring apparatus having a plurality of spaced reed switches vertically aligned for positioning in a liquid, each reed switch vertically overlapping the adjacent above and below reed switches, the longitudinal axis of said reed switches being at an angle to the vertical axis of the apparatus and a float carrying magnetic means movably positioned adjacent said plurality of switches, said magnetic means having a magnetic field for sequentially actuating switches as the float moves relative to the switches, the improvement comprising, a microprocessor electrically connected to the liquid level measuring apparatus, said switches electrically connected together in parallel in a plurality of sets, a plurality of shift registers, each register connected to one of the sets of switches, said registers connected together and to the microprocessor for supplying a parallel to serial conversion of the open or closed status of each switch, said microprocessor providing an output signal indicating the vertical position of the float relative to said switches, and means connected to the microprocessor for noting inoperative switches and disregarding the reading of the inoperative switches.

8. The apparatus of claim 7 wherein said microprocessor stores a list of said inoperative switches.

9. The apparatus of claim 8 including means electrically connected to said microprocessor for updating the list of inoperative switches.

* * * * *

UNITED STATES PATENT AND TRADEMARK OFFICE
CERTIFICATE OF CORRECTION

PATENT NO. : 5,347,864
DATED : September 20, 1994
INVENTOR(S) : Senghaas, et. al.

It is certified that error appears in the above-indentified patent and that said Letters Patent is hereby corrected as shown below:

Column 4, line 59, change "38" to -- 3B --

Column 8, line 48, after "electrode" insert -- adjacent --

Column 9, line 38, change "simultaneous" to -- simultaneously --

Signed and Sealed this

Seventh Day of March, 1995

Attest:

BRUCE LEHMAN

Attesting Officer

Commissioner of Patents and Trademarks